(12) United States Patent
Millward et al.

(10) Patent No.: US 11,053,965 B2
(45) Date of Patent: Jul. 6, 2021

(54) ARTICLE MANAGEMENT CLIP AND METHOD OF USE THEREOF

(71) Applicant: ILLINOIS TOOL WORKS INC., Glenview, IL (US)

(72) Inventors: Eric William Millward, Evanston, IL (US); Steven Craig Keller, Island Lake, IL (US); Scott David Kolasa, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/665,676

(22) Filed: Oct. 28, 2019

(65) Prior Publication Data

US 2020/0141432 A1     May 7, 2020

Related U.S. Application Data

(60) Provisional application No. 62/756,837, filed on Nov. 7, 2018.

(51) Int. Cl.
*F16B 2/24* (2006.01)
*A44B 15/00* (2006.01)
*A44B 13/02* (2006.01)
*F16B 2/22* (2006.01)
*B65H 75/20* (2006.01)

(52) U.S. Cl.
CPC ............... *F16B 2/24* (2013.01); *A44B 13/02* (2013.01); *A44B 15/00* (2013.01); *B65H 75/20* (2013.01); *F16B 2/22* (2013.01)

(58) Field of Classification Search
CPC .... F16B 2/24; F16B 2/22; F16B 45/00; A44B 15/00; A44B 13/02; B65H 75/20; B65H 75/366; B65H 2701/3919
See application file for complete search history.

(56) References Cited

U.S. PATENT DOCUMENTS

| | | | | |
|---|---|---|---|---|
| 3,057,028 | A | * | 10/1962 | Lorber ...................... B42F 1/10 24/67.9 |
| 4,587,818 | A | | 5/1986 | Griffin |
| 5,201,799 | A | * | 4/1993 | Johnson .................. F16B 21/18 24/563 |
| D453,676 | S | * | 2/2002 | Pliml, Jr. ..................... D19/100 |
| 7,401,388 | B2 | * | 7/2008 | Hansen ................. F16B 5/0614 24/292 |
| D636,293 | S | * | 4/2011 | Dolce .......................... D11/222 |
| D759,475 | S | * | 6/2016 | Banno ........................... D8/395 |
| D808,787 | S | * | 1/2018 | Kinskey ........................ D8/395 |

OTHER PUBLICATIONS

Office Action for counterpart German Patent Application No. 10 2019 129 461.4, dated Nov. 11, 2020 (5 pages).

* cited by examiner

*Primary Examiner* — Robert Sandy
*Assistant Examiner* — Louis A Mercado
(74) *Attorney, Agent, or Firm* — Quarles & Brady LLP

(57) ABSTRACT

An article management clip includes a body having a tab, a first arm extending from the tab, a second arm extending from the tab, and a first member connecting the first arm with the second arm. The tab has a securement nub, and the body includes a resilient material.

17 Claims, 17 Drawing Sheets

ARTICLE MANAGEMENT CLIP AND METHOD OF USE THEREOF

CROSS REFERENCE TO RELATED APPLICATIONS

This application is based on, claims priority to, and incorporates herein by reference in its entirety U.S. Provisional Application Ser. No. 62/756,837, filed on Nov. 7, 2018, and entitled "Article Management Clip and Method of Use Thereof".

BACKGROUND

Clips for storing articles such as keys, cords, cables, and other similar objects are used in a variety of applications, such as cable management systems, key holders, and rope or string retention systems. However, many currently available clips are unable to perform multiple functions, such as having the ability to accept and store both keys and cords. Further, many available clips require complex and cumbersome cord wrapping layouts, and are not constructed so as to be easily mountable inside of a bag, apparel, and/or other accessories. Still further, many prior art clips do not allow for quick storage and removal of cords and/or keys when a user desires to remove or decouple the cords and/or keys from such clips.

SUMMARY

An article management clip includes a body having a tab, a first arm extending from the tab, a second arm extending from the tab, and a member connecting the first arm with the second arm, wherein the tab comprises a planar surface and a securement nub, and wherein the body comprises a resilient material.

In some embodiments, the body is an integral component. In some embodiments, the body comprises a metal. In some embodiments, a second member extends between the first arm and the second arm, and is spaced apart from the first member. In some embodiments, the first arm includes a concave portion and the second arm includes a concave portion. In some embodiments, the body is configured to act as a spring by retracting into a first position after being manipulated into a second position by a user. In some embodiments, the first leg and the second leg are connected at a joint, and the first leg and the second leg define an angle of less than about 50 degrees. In some embodiments, the body is symmetric about a plane that intersects the tab.

In another embodiment, an article management clip includes a unitary body comprising a tab defining a first end, a first arm extending from the tab, a second arm extending from the tab, and an upper bar defining a second end, the upper bar being integrally connected with the first arm and the second arm. The tab comprises a planar surface and a securement nub.

In some embodiments, the body comprises a polymer. In some embodiments, the body comprises a metal. In some embodiments, a cylindrical bar extends between the first arm and the second arm and is spaced from the upper bar. In some embodiments, the first arm includes a concave portion and the second arm includes a concave portion. In some embodiments, a first plane and a second plane that are orthogonal with respect to one another extend through the first arm, the second arm, and the securement nub. In some embodiments, the first leg and the second leg are connected at a joint, and the first leg and the second leg define an angle of less than about 30 degrees.

In yet another embodiment, an article management clip comprises a unitary body including a tab defining a first end, a first arm extending from the tab, a second arm extending from the tab, and an upper bar defining a second end, the upper bar being integrally connected with the first arm and the second arm. The tab comprises a planar surface and a securement nub, and a first plane and a second plane that are orthogonal with respect to one another extend through the first arm, the second arm, and the securement nub.

In some embodiments, the body comprises a polymer or a metal. In some embodiments, a cylindrical bar extends between the first arm and the second arm, and is spaced apart from the upper bar. In some embodiments, the first arm includes a concave portion and the second arm includes a concave portion.

DETAILED DESCRIPTION

While the devices disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

FIGS. 1-16 depict an article management clip 100 that is operable to accept and store cords, keys, hooked objects, and other types of articles that may require securement or storage.

Figure 1:
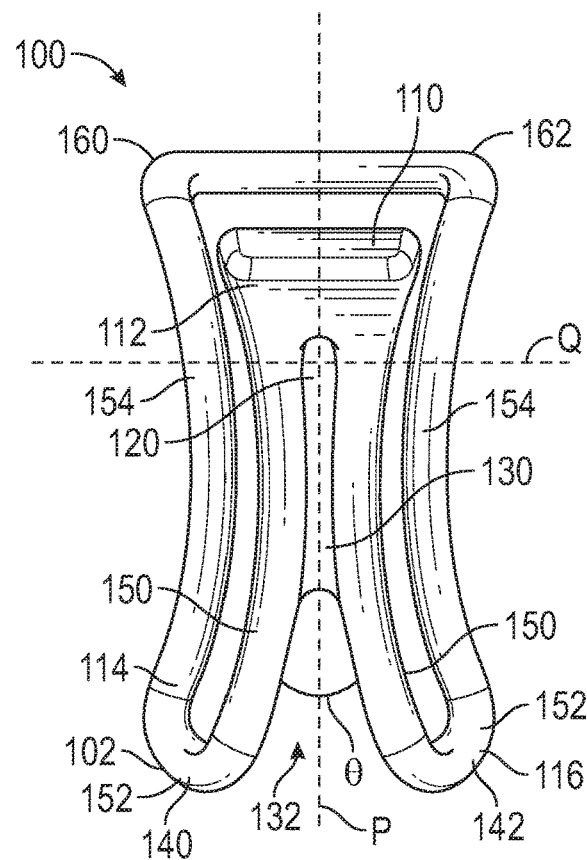
FIG. 1 is front view of an article management clip.

Referring to FIG. 1, the clip 100 includes a body 102 that is configured to create a secure hold onto cord coils of a number of diameters and shapes as well as other types of loose articles. The body 102 is formed in such a way that it has characteristics of an elastically deformable spring, and acts as a resilient structure when the body 102 is compressed by a force being applied thereto, for example, a force applied by the thumb of a user. The body 102 may comprise a polymeric material, a metallic material that may or may not have a coating applied thereto, or another type of resilient material, i.e., a material capable of absorbing energy when it is deformed elastically, and releasing that energy upon unloading.

Still referring to FIG. 1, a first end 110 of the body 102 defines a tab 112, i.e., a thumb tab, which allows for easy opening and removal of cords and/or keys by a user, as described in greater detail hereinafter below. A first or left arm 114 extends downwardly from the tab 112 and away from a vertical axis P that bisects the body 102. A second or right arm 116 also extends downwardly from the tab 112 and away from the axis P. The left arm 114 and the right arm 116 intersect the tab 112 at an intersection point 120 defining a horizontal axis Q. The left arm 114 and the right arm 116 are rigidly coupled to one another at a joint 130, which extends along a portion of the axis P. A gap 132 is provided between the left arm 114 and the right arm 116 at a location below the joint 130, i.e., away from the axis Q. As a result, the left arm 114 and the right arm 116 extend outwardly, away from the axis P, and downwardly, away from the axis Q. An angle Θ is formed by the left arm 114 and the right arm 116 at the joint 130, the angle Θ being between about 10 degrees and about 50 degrees, or between about 20 degrees and about 40 degrees, or about 30 degrees. The left arm 114 and the right arm 116 each extend downward, away from the axis Q and outward, away from the axis P until reaching a lowermost first inflection point 140, and a lowermost second inflection point 142, respectively.

Figure 2:
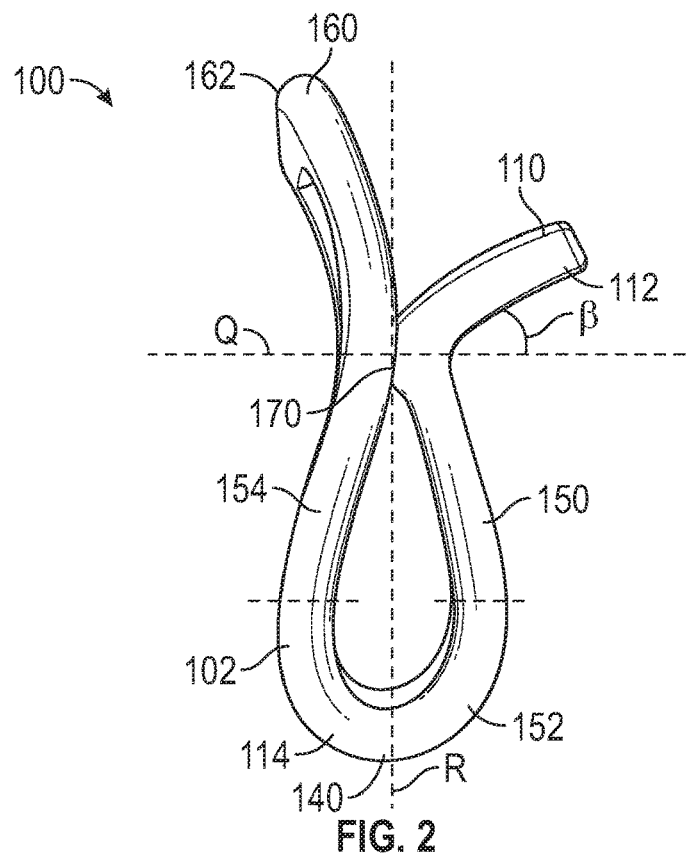
FIG. 2 is a left side view of the article management clip of FIG. 1, the right side view being a mirror image thereof.

Referring now to FIG. 2, a left view of the clip 100 is shown. While a right view of the clip 100 is not illustrated herein, the description below with respect to the first or left arm 114 applies mutandis mutatis to the second or right arm 116 since the left arm 114 and the right arm 116 are symmetrical. As illustrated in FIG. 2, the tab 112 defines an angle β with the horizontal axis Q of about 20 degrees. However, in some embodiments, the tab 112 may define an angle with the horizontal axis Q of between about 5 degrees and about 30 degrees, or between about 10 and about 25 degrees. Still referring to FIG. 2, the left arm 114 extends downward from the joint 130, and bows outward. The left arm 114 comprises a first segment 150, defining a generally straight segment that extends from the tab 112 to a point where the left arm 114 begins to curve inwardly, a second segment 152 that comprises a U-shaped segment (when viewed from the side), and a third segment 154 that is connected to the second segment 152. The third segment 154 comprises a spline-shaped portion that bows in a concave manner, when viewed from the side. As can be appreciated, the geometry of the above-described first, second, and third segments 150, 152, 154 is described with respect to the side view, the geometry changing based on a vantage point of the clip 100. As noted above, the right arm 116 also comprises a first segment 150, a second segment 152, and a third segment 154.

Figure 3:
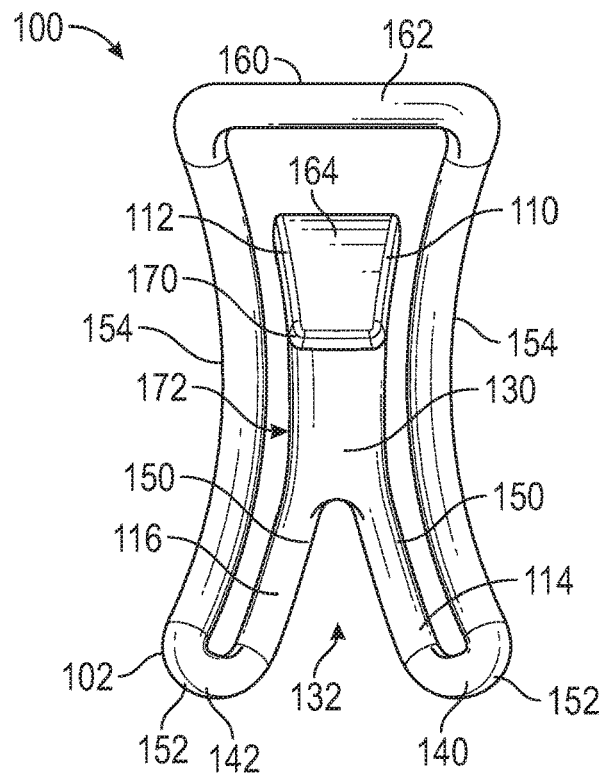
FIG. 3 is a rear view of the article management clip of FIG. 1.

Still referring to FIG. 2, an upper bar or member 160 extends between the left arm 114 and the right arm 116 at a second end 162 of the body 102, the bar being substantially parallel with respect to the horizontal axis Q. In some embodiments, the bar or member 160 may include a pad or planar plate that extends between the left arm 114 and the right arm 116, which may be configured to be sewn through a portion of an accessory to attach the clip 100 thereto. In the present embodiment, the bar 160 provides significant rigidity to the clip 100, and ensures that the clip 100 maintains its structural integrity during use thereof. A second vertical axis R is also shown intersecting both the horizontal axis Q and the second segment 152. Referring to FIG. 3 where the bar 160 is shown in greater detail, a surface 164 of the tab 112, which may be a planar surface, is provided to allow a user to grasp or otherwise manipulate the tab 112 to articulate the clip 100 from a closed state to an article-receiving state. A tooth or retention nub 170 extends from the tab 112, inwardly toward an opening 172 defined between the left arm 114, the right arm 116, and the bar 160. The retention nub 170 is also intersected by the axis R. The opening 172 is not bounded along a lower end thereof by any portion of the clip 100. Referring back to FIG. 2, the retention nub 170 forms a closed loop such that an article that is placed into the clip 100 may not be removed therefrom without manipulation of the tab 112 into the article-receiving state. It is contemplated that the axes P, Q, and R may be planes that extend into the page.

Figure 4:
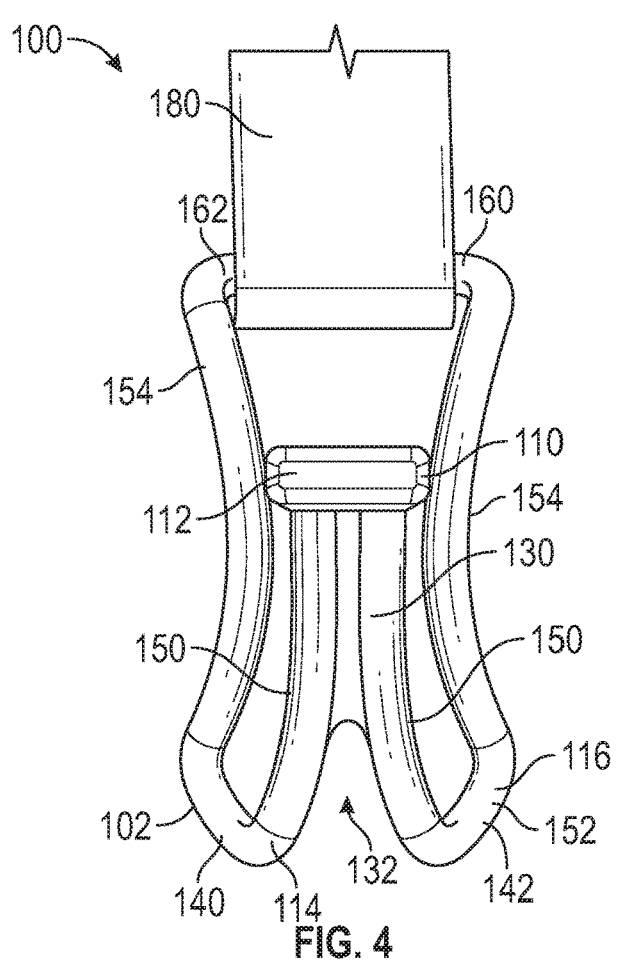
FIG. 4 is a front view of the article management clip of FIG. 1 having webbing coupled to an upper end thereof.

Referring to FIG. 4, webbing 180 is shown coupled with the clip 100, the webbing allowing the clip 100 to be secured to an accessory or other device. Other types of clip retention mechanisms may be utilized, such as a cord, string, chain, cloth, yarn, or thread, so as to securely retain the clip 100 to or with an accessory of some kind, such as a backpack, a purse, clothing, etc. The webbing 180 is shown secured about the bar 160. The webbing 180 may surround an entire length of the bar 160, or the webbing 180 may surround only a portion of the bar 160.

Figure 5:
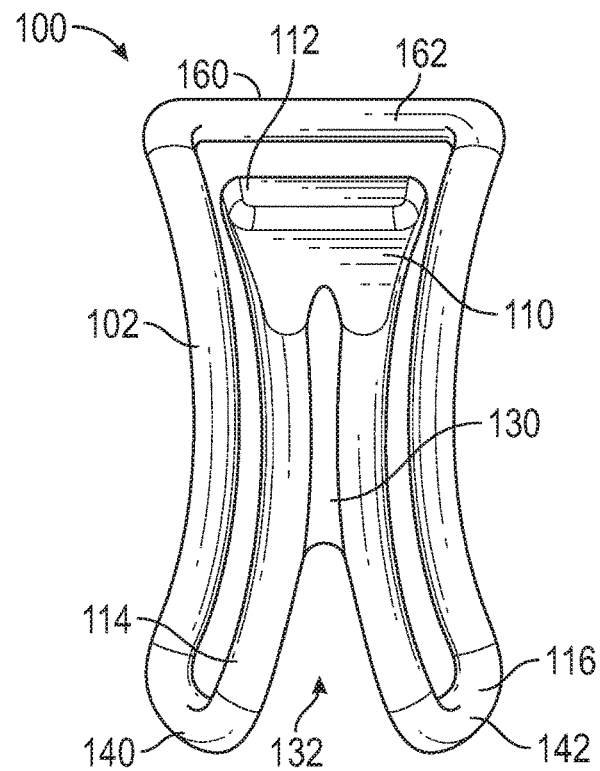
FIG. 5 is another front view of the article management clip of FIG. 1.
Figure 6:
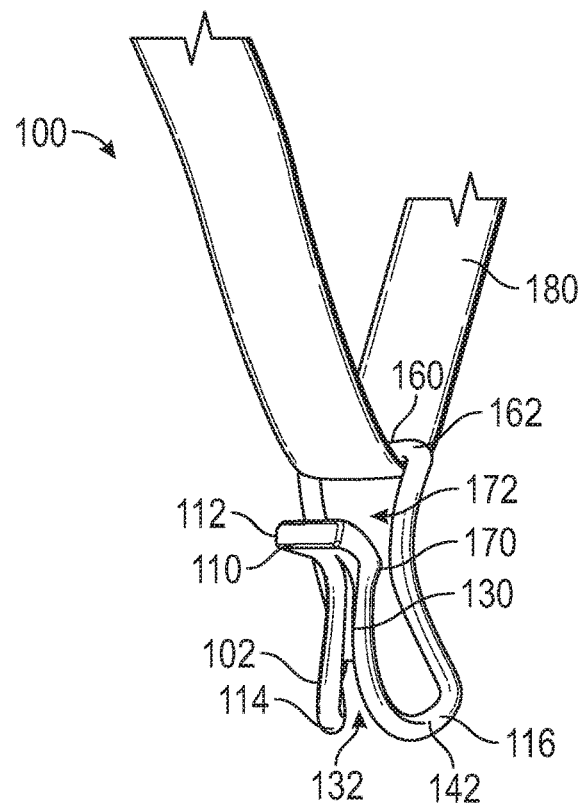
FIG. 6 is a front and right side perspective view of the article management clip of FIG. 1 having webbing freely secured to an upper end of the article management clip.
Figure 7:
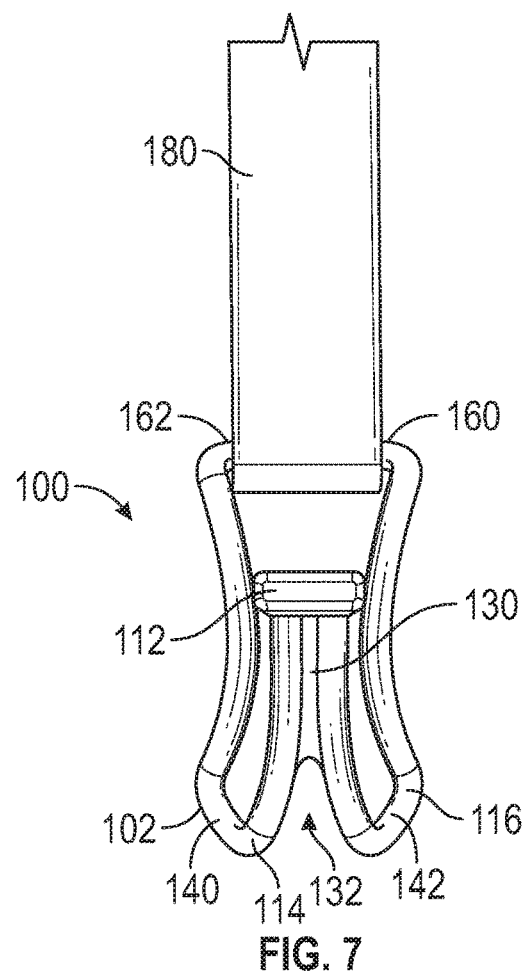
FIG. 7 is a front view of the article management clip of FIG. 1 having webbing securely coupled to an upper end of the article management clip.
Figure 8:
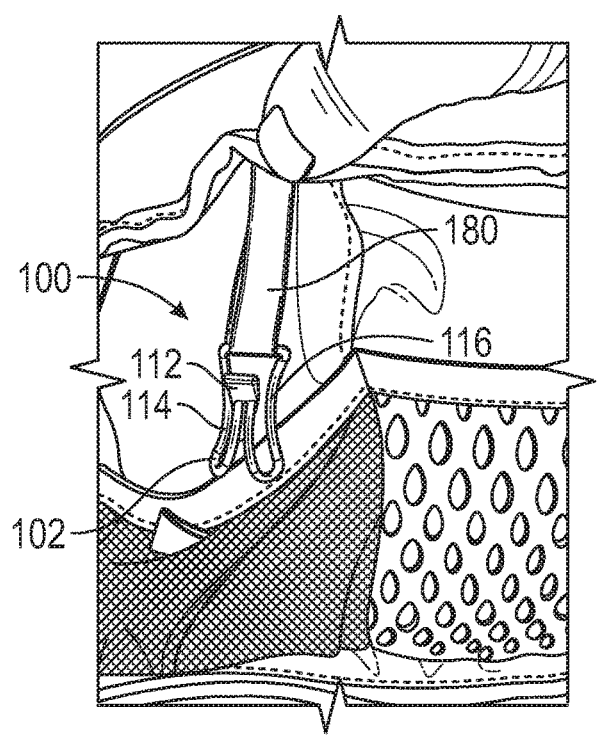
FIG. 8 is a front and right side perspective view of the article management clip and webbing of FIG. 7 with a first end of the webbing secured to an accessory.

Referring now to FIG. 5, the clip 100 is shown in a closed state. Referring to FIG. 6, the webbing 180 is shown in a loose state provided through the opening 172 and along a bottom end of the bar 160. In such a configuration, the clip 100 may be free to move along the webbing 180 to allow for differing locations of the clip along the webbing 180. Referring to FIGS. 7 and 8, the clip 100 is shown secured to an end of the webbing 180. In such a configuration, the clip 100 may be fixedly secured to the webbing 180 such that the clip 100 is immovable along the webbing 180 and may remain in such a configuration unless the clip 100 is removed or uncoupled from the webbing 180. With specific reference to FIG. 8, the clip 100 is shown within an accessory environment, such that each end of the webbing 180 is secured, i.e., one end of the webbing 180 is secured to the clip, and another end of the webbing 180 is secured to an accessory.

Figure 9:
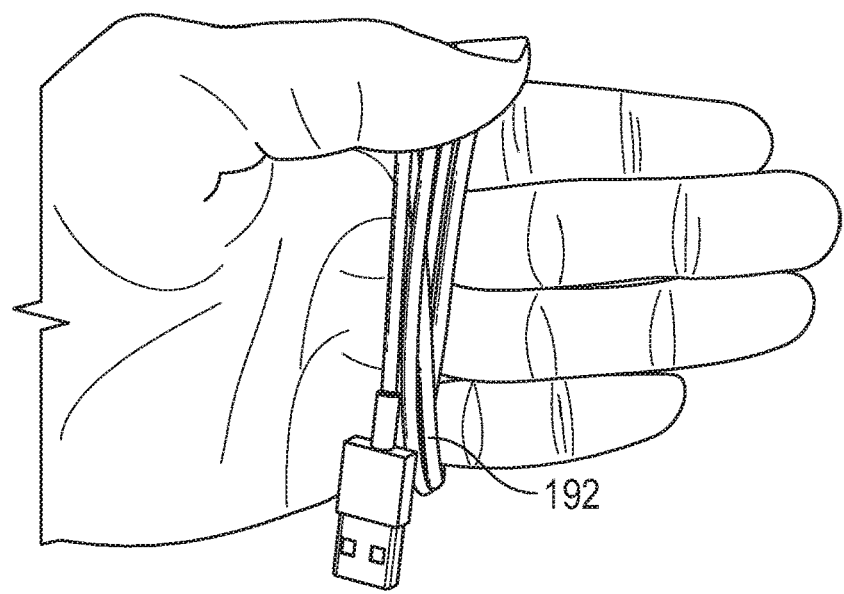
FIG. 9 is a front perspective view of an example article, i.e., a cord, which is wrapped around a user's hand.
Figure 10:
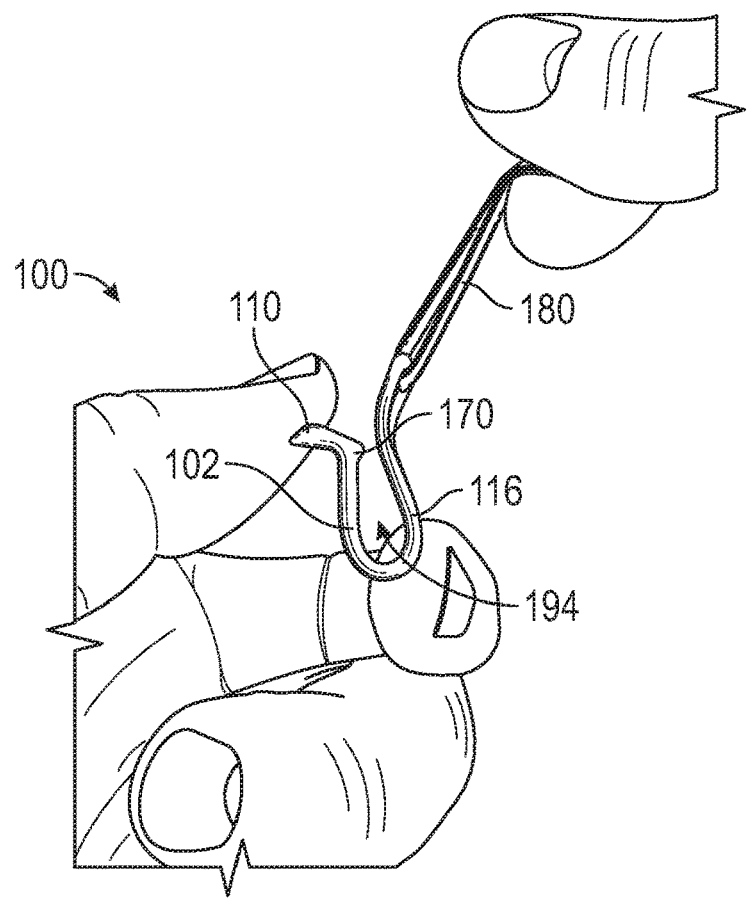
FIG. 10 is a right side view of the article management clip of FIG. 1 shown in an open configuration.
Figure 11:
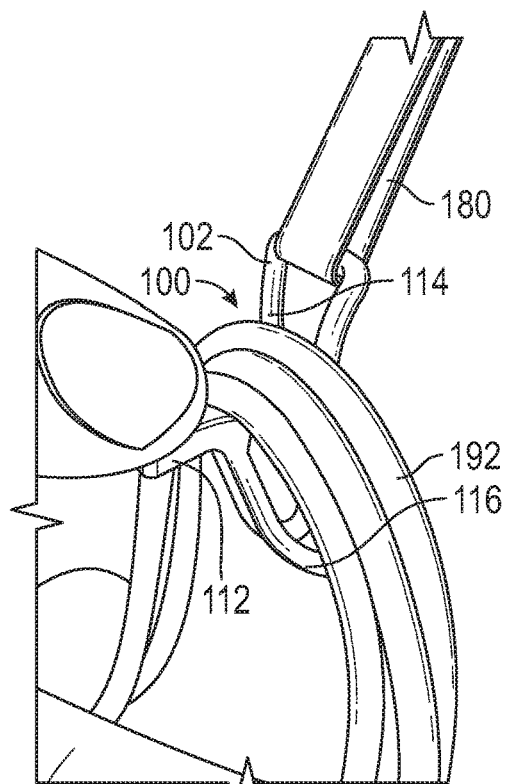
FIG. 11 is a front and right side perspective view of the article management clip of FIG. 10 in an article-receiving configuration, receiving the cord of FIG. 9.
Figure 12:
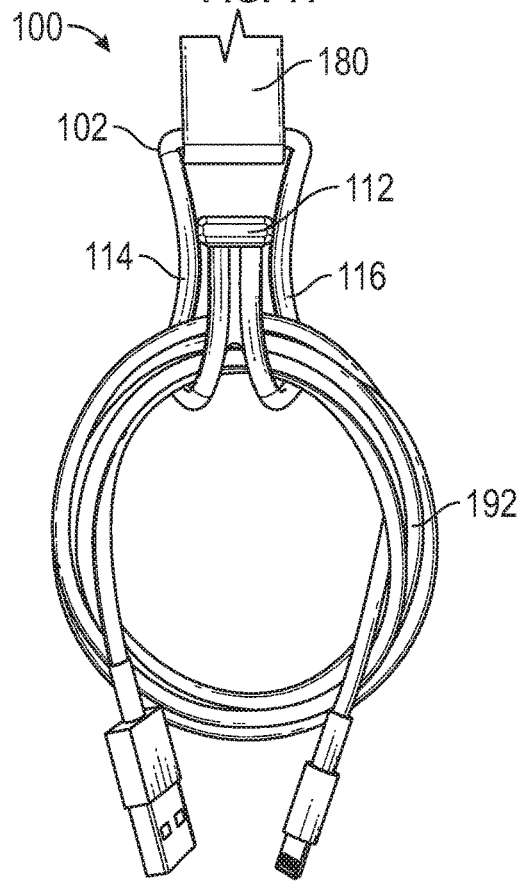
FIG. 12 is a front view of the article management clip of FIG. 10 in a closed configuration, securing the cord of FIG. 9.
Figure 13:
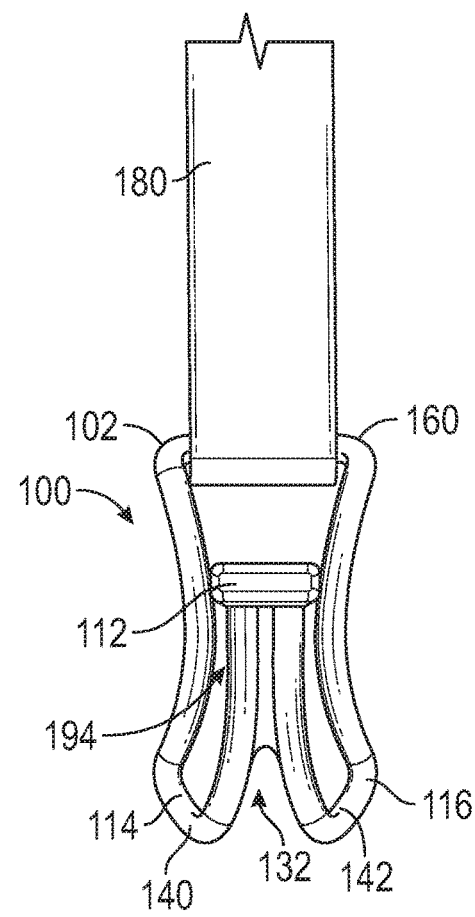
FIG. 13 is a front view of the article management clip of FIG. 1 in the closed configuration.
Figure 14:
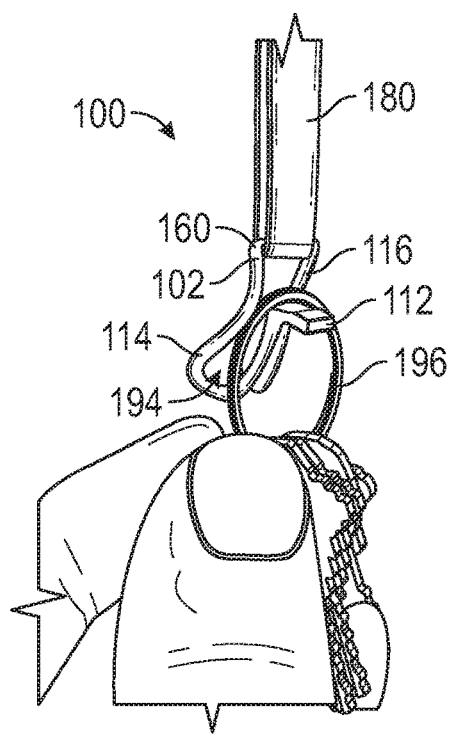
FIG. 14 is a front and left perspective view of the article management clip of FIG. 13 in an article-receiving configuration, receiving a set of keys.

Referring now to FIGS. 9-12, the functionality of the clip 100 will be described with respect to securement of a cord 192, such as a cord to charge a cellular phone. The cord 192 is shown in FIG. 9, and the clip 100 is shown in an article-receiving configuration in FIG. 10. When a user desires to secure the cord 192 within the clip 100, the user manipulates the tab 112 of the clip 100 such that the tab 112 is pulled away from the bar 160. After the tab 112 has been moved away from the bar 160, the clip 100 is in an article-receiving configuration. In the article-receiving configuration, a user may secure the cord 192 within a cavity 194 defined by the left arm 114, right arm 116, and nub 170 of the tab 112. Once a user ceases to apply a force to the tab 112, the clip 100 resiliently deforms back to its original state, i.e., a closed state, and the cord 192 is securely retained within the clip 100, as shown in FIG. 12. In the closed state, the clip 100 applies a light amount of pressure to the cord 192, which provides the benefit of retaining the cord 192 and preventing the cord 192 from unraveling while being retained within the clip 100.

Figure 15:
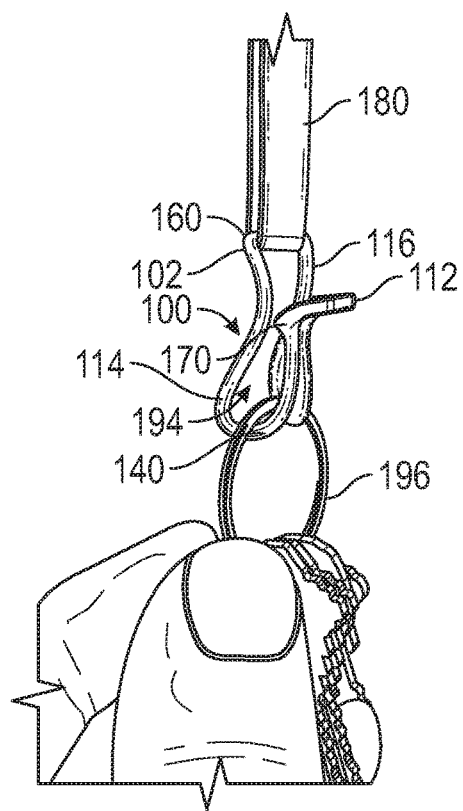
FIG. 15 is a front and left side view of the article management clip of FIG. 13 in the closed configuration, securing the set of keys.
Figure 16:
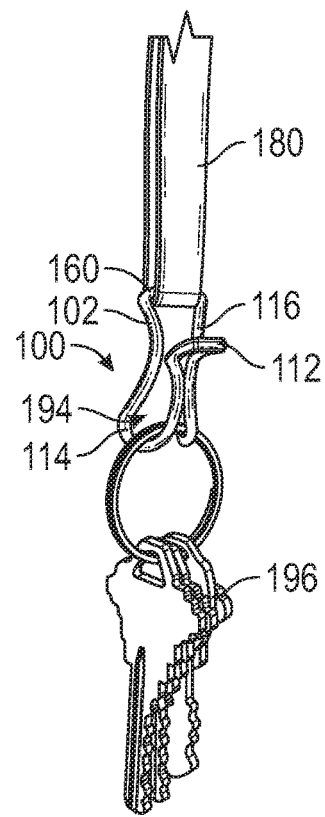
FIG. 16 is another front and left perspective view of the article management clip of FIG. 13 in the closed configuration.

Referring now to FIGS. 13-16, the functionality of the clip 100 with respect to securement of a set of keys 196 will be described. The clip 100 is shown in a closed configuration in FIG. 13. The clip 100 is shown in an article receiving-configuration in FIG. 14, where a user slides a ring from the set of keys 196 along the tab and the third segment 154 of the first and second arms 114, 116. The force of pulling the keys down is adequate to separate and translate the tab 112 away from the first and second arms 114, 116, which allows a user to secure an article, such as the set of keys 196, within the clip 100 without having to apply an additional force, e.g., a force required to manipulate the tab 112 by a user's thumb. As illustrated in FIG. 15, the keys 196 may hang or dangle adjacent the first and second lowermost points 140, 142 of the first and second arms 114, 116, respectively. FIG. 16 shows the set of keys 196 being retained within the clip 100.

FIGS. 17-34 depict another embodiment of an article management clip 200 that is also operable to accept and store cords, keys, hooked objects, and other types of articles that may require securement or storage.

Figure 17:
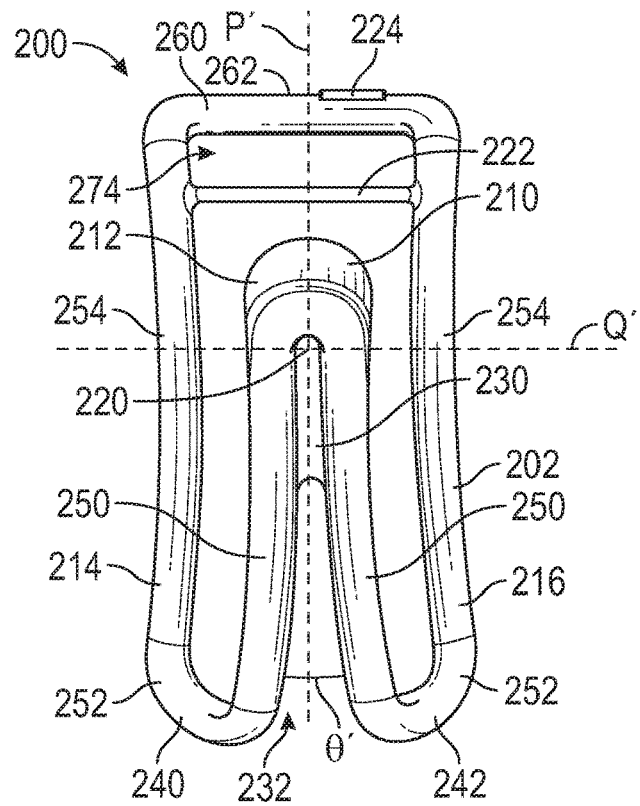
FIG. 17 is front view of another embodiment of an article management clip.

Referring to FIG. 17, the clip 200 includes a body 202 that is configured to create a secure hold on cord coils of a number of diameters and shapes as well as other types of loose articles. The body 202 is formed in such a way that it has characteristics of an elastically deformable spring, and acts as a resilient structure when the body 202 is compressed by force being applied thereto, for example, a force applied by the thumb of a user. The body 202 may comprise a polymeric material, a metallic material that may or may not have a coating applied thereto, or another type of resilient material, i.e., a material capable of absorbing energy when it is deformed elastically, and releasing that energy upon unloading.

Still referring to FIG. 17, a first end 210 of the body 202 defines a tab 212, i.e., a thumb tab, which allows for easy opening and removal of cords and/or keys by a user, as described in greater detail hereinafter below. The tab 212 is slightly smaller, thinner, and more elongate than the tab 112 discussed above. Further, a distal end of the tab 212 is slightly more rounded than the tab 112 discussed above. A first or left arm 214 extends downwardly from the tab 212 and away from a vertical axis P' that bisects the body 202. A second or right arm 216 also extends downwardly from the tab 212 and away from the axis P'. The left arm 214 and the right arm 216 intersect the tab 212 at an intersection point 220 defining a horizontal axis Q'. A stability bar or member 222 extends between the left arm 214 and the right arm 216 at a location spaced above the tab 212. The stability bar 222 is preferably integral with the left arm 214 and the right arm 216. The stability bar 222 is preferably cylindrical. Further, an injection molding gate 224 is provided at an upper end of the body 202, which defines a flat section to allow for injection molding of the clip 200.

The left arm 214 and the right arm 216 are rigidly coupled to one another at a joint 230, which extends along a portion of the axis P'. The joint 230 does not extend as far from the line Q' as the joint 130 extends from the line Q. A gap 232 is provided between the left arm 214 and the right arm 216 at a location below the joint 230, i.e., away from the axis Q'. As a result, the left arm 214 and the right arm 216 extend outwardly, away from the axis P', and downwardly, away from the axis Q'. An angle Θ' is formed by the left arm 214 and the right arm 216 at the joint 230, the angle Θ' being between about 10 degrees and about 50 degrees, or between about 20 degrees and about 40 degrees, or about 30 degrees. The left arm 114 and the right arm 116 each extend downward, away from the axis Q' and outward, away from the axis P' until reaching a lowermost first inflection point 240, and a lowermost second inflection point 242, respectively.

Figure 18:
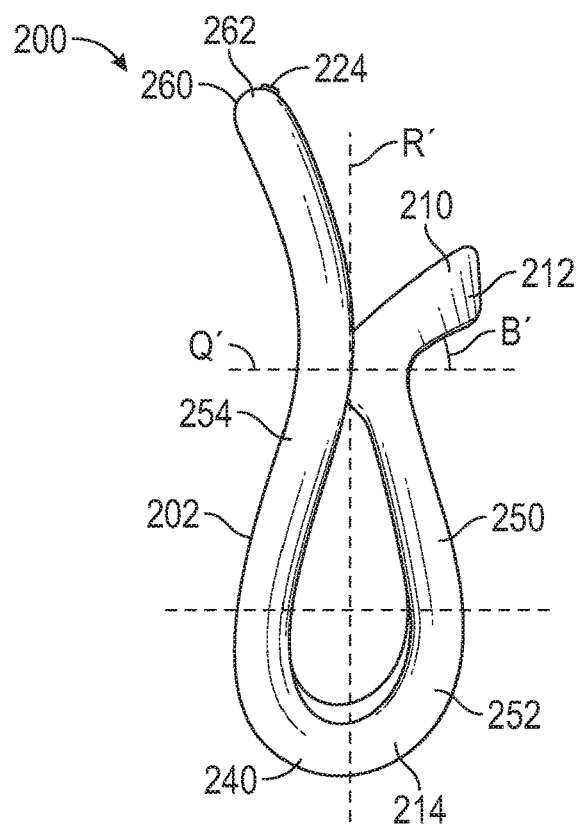
FIG. 18 is a left side view of the article management clip of FIG. 17, the right side view being a mirror image thereof.

Referring now to FIG. 18, a left view of the clip 200 is shown. While a right view of the clip 200 is not illustrated herein, the description below with respect to the first or left arm 214 applies mutandis mutatis to the second or right arm 216 since the left arm 214 and the right arm 216 are symmetrical. As illustrated in FIG. 18, the tab 212 defines an angle β' with the horizontal axis Q' of about 20 degrees.

However, in some embodiments, the tab 212 may define an angle with the horizontal axis Q' of between about 5 degrees and about 30 degrees, or between about 10 and about 25 degrees. Still referring to FIG. 18, the left arm 214 extends downward from the joint 230, and bows outward. The left arm 214 comprises a first segment 250, defining a generally straight segment that extends from the tab 212 to a point where the left arm 214 begins to curve inwardly, a second segment 252 that comprises a U-shaped segment (when viewed from the side), and a third segment 254 that is connected to the second segment 252. The third segment 254 comprises a spline-shaped portion that bows in a concave manner, when viewed from the side. As can be appreciated, the geometry of the above-described first, second, and third segments 250, 252, 254 is described with respect to the side view, the geometry changing based on a vantage point of the clip 200. As noted above, the right arm 216 also comprises a first segment 250, a second segment 252, and a third segment 254.

Figure 19:
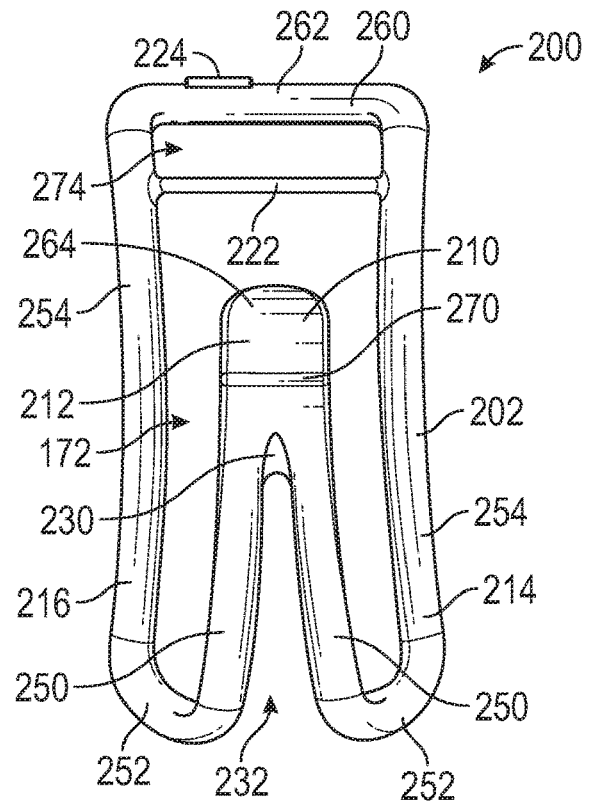
FIG. 19 is a rear view of the article management clip of FIG. 17.
Figure 20:
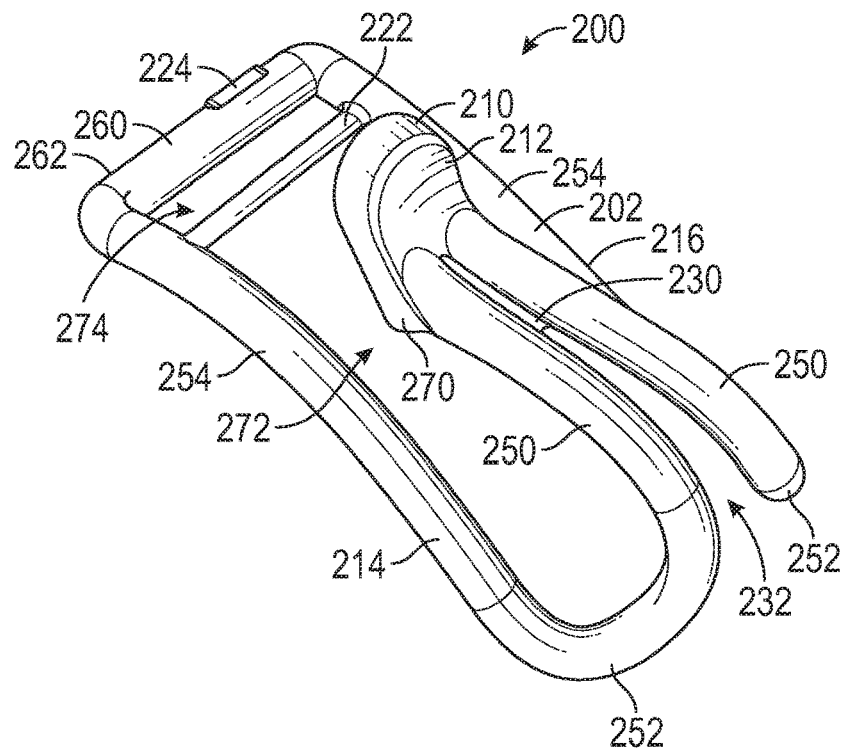
FIG. 20 is a perspective view of the article management clip of FIG. 17.

Still referring to FIG. 18, an upper bar or a first bar 260 extends between the left arm 214 and the right arm 216 at a second end 262 of the body 202, the bar being substantially parallel with respect to the horizontal axis Q'. The first bar 260 provides significant rigidity to the clip 200, and ensures that the clip 200 maintains its structural integrity during use thereof. A second vertical axis R' is also shown intersecting both the horizontal axis Q' and the second segment 252. Referring to FIG. 19 where the first bar 160 is shown in greater detail, a surface 264 of the tab 212, which may be a planar surface, is provided to allow a user to grasp or otherwise manipulate the tab 212 to articulate the clip 200 from a closed state to an article receiving state. A tooth or retention nub 270 extends from the tab 112, inwardly toward a first opening 272 defined between the left arm 214, the right arm 216 and the stability bar 222. A second opening 274 is defined between the left arm 214, the right arm 216, the stability bar 222, and the first bar 260. The retention nub 270 is also intersected by the axis R'. The opening 272 is not bounded along a lower end thereof by any portion of the clip 200, while the opening 274 is bounded on all four sides. Referring back to FIG. 18, the retention nub 270 forms a closed loop such that an article that is placed into the clip 200 may not be removed therefrom without manipulation of the tab 212 into the article-receiving state. It is contemplated that the axes P', Q', and R' may be planes that extend into the page.

Figure 21:
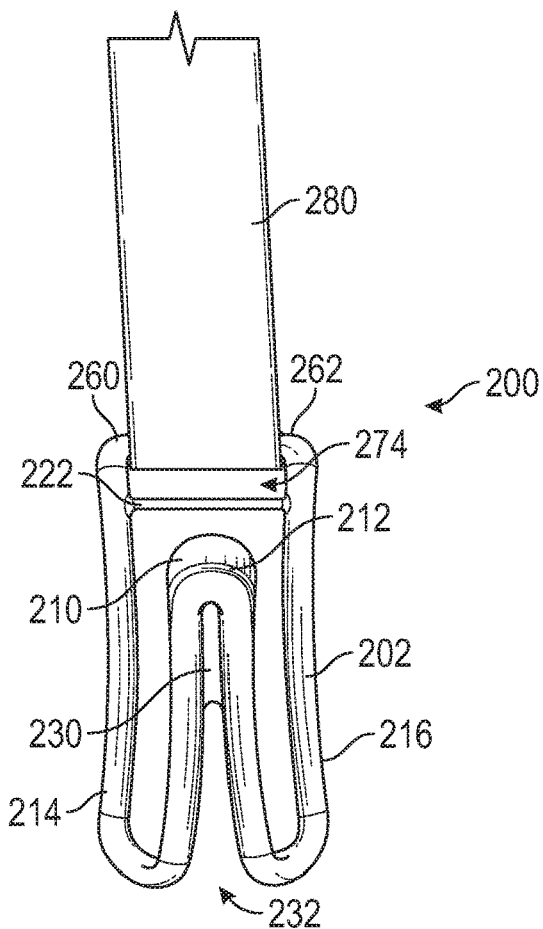
FIG. 21 is a front view of the article management clip of FIG. 1 having webbing coupled to an upper end thereof.

Referring to FIG. 21, webbing 280 is shown coupled with the clip 200, the webbing 280 allowing the clip 200 to be secured to an accessory or other device. Other types of clip retention mechanisms may be utilized, such as a cord, string, chain, cloth, yarn, or thread, so as to securely retain the clip 200 to an accessory of some kind, such as a backpack, a purse, clothing, etc. The webbing 280 is shown secured about the bar 260. The webbing 280 may surround an entire length of the first bar 260, or the webbing 280 may surround only a portion of the bar 260.

Figure 22:
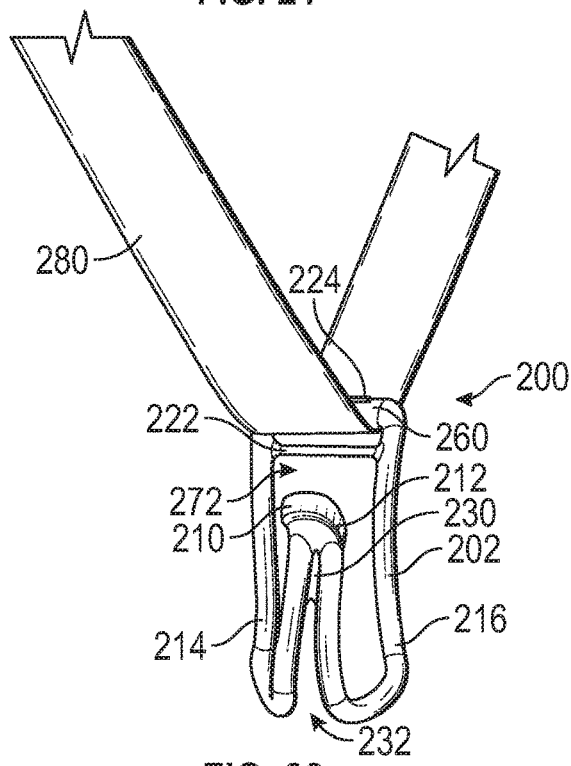
FIG. 22 is a front and right side perspective view of the article management clip of FIG. 17 having webbing freely secured to an upper end of the article management clip.
Figure 23:
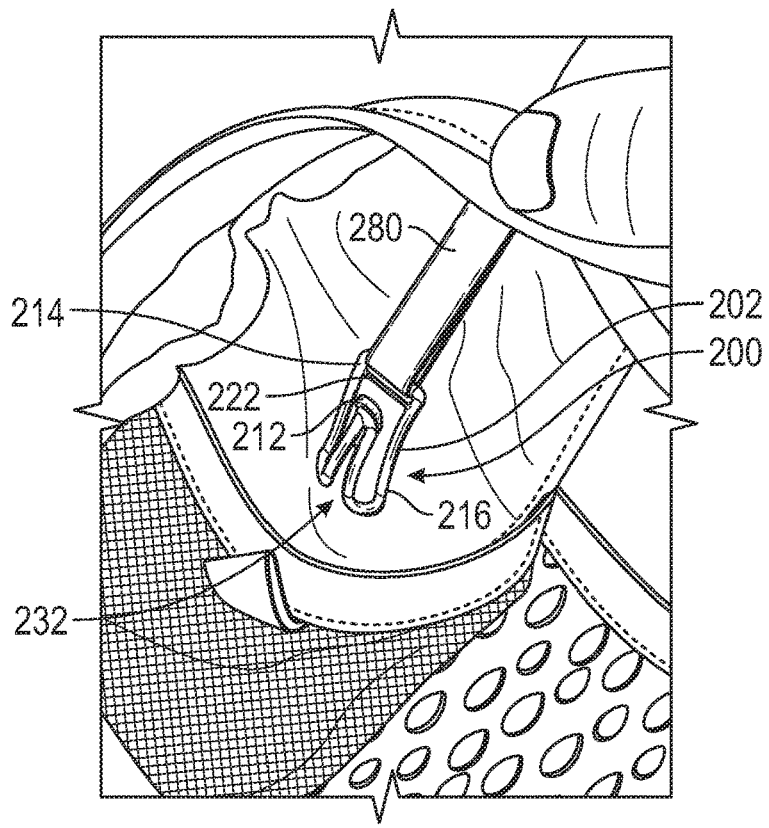
FIG. 23 is a front and right side perspective view of the article management clip and webbing of FIG. 21 with a first end of the webbing secured to an accessory.
Figure 24:
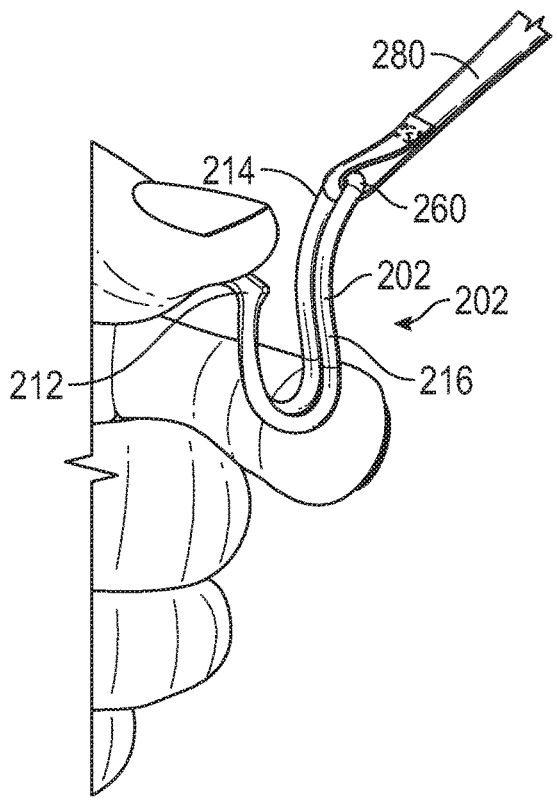
FIG. 24 is a right side view of the article management clip of FIG. 17 shown in an open configuration.
Figure 25:
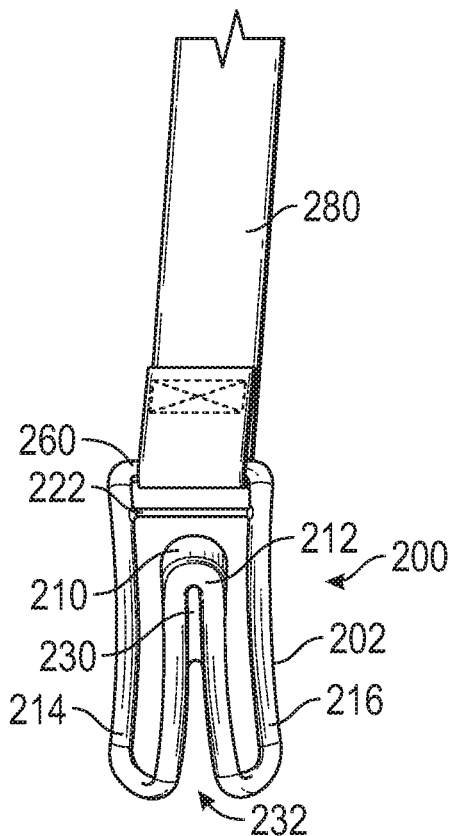
FIG. 25 is a front view of the article management clip of FIG. 17 attached with webbing and in a closed configuration.

Referring now to FIGS. 21-23, the clip 200 is shown in a closed state. Referring to FIG. 22, the webbing 280 is shown in a loose state provided through the opening 274 that is disposed between the stability bar 222 and the first bar 260. In such a configuration, the clip 200 may be free to move along the webbing 280 to allow for differing locations of the clip 200 along the webbing 280. Referring to FIGS. 23 and 24, the clip 200 is shown secured to an end of the webbing 280. In such a configuration, the clip 200 may be fixedly secured to the webbing 280 such that the clip 200 is immovable along the webbing 280 and may remain in such a configuration unless the clip 200 is removed or uncoupled from the webbing 280. With specific reference to FIG. 23, the clip 200 is shown within an accessory environment, such that each end of the webbing 280 is secured, i.e., one end of the webbing 280 is secured to the clip 200, and another end of the webbing 280 is secured to an accessory.

Figure 26:
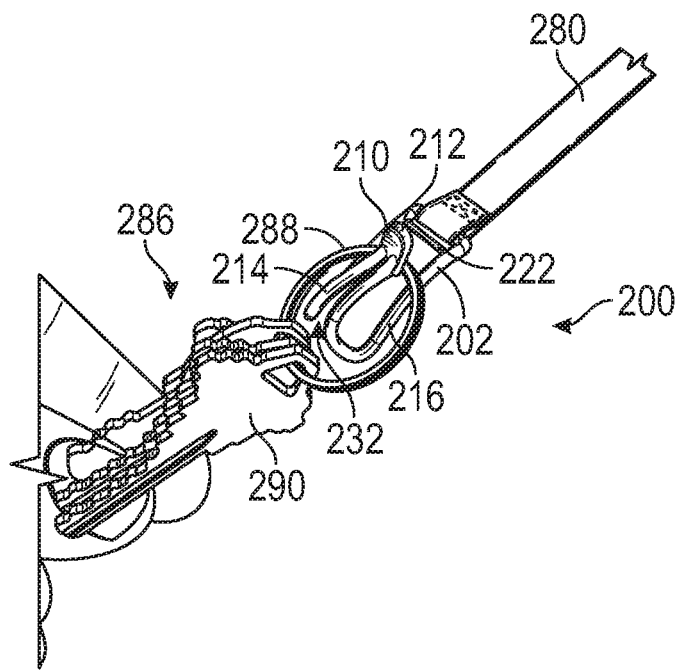
FIG. 26 is a front and left perspective view of the article management clip of FIG. 25 in an article-receiving configuration, receiving a set of keys.
Figure 27:
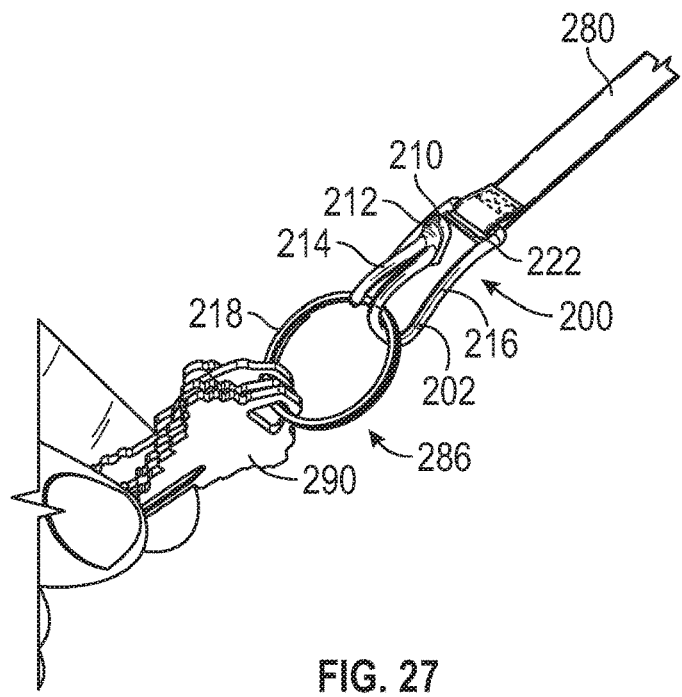
FIG. 27 is a front and left side view of the article management clip of FIG. 25 in the closed configuration, securing the set of keys.
Figure 28:
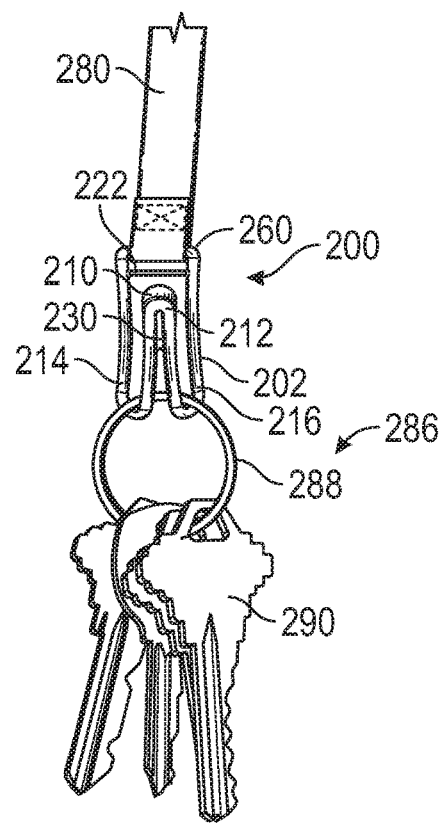
FIG. 28 is a front view of the article management clip and set of keys of FIG. 27 in the closed configuration.

Referring now to FIGS. 26-28, the functionality of the clip 200 will be described with respect to securement of a set of keys 286, and more specifically, to a ring 288 around which a plurality of keys 290 are secured. FIG. 26 illustrates the set of keys 286 in a pre-engagement configuration with the clip 200. FIG. 27 illustrates the set of keys 286 in a secured or closed configuration within the clip, with a user's hand pulling the keys 286 toward a fully secured configuration. FIG. 28 illustrates the set of keys 286 in the closed configuration. The force of pulling the keys 286 down is adequate to separate and translate the tab 212 away from the first and second arms 214, 216, which allows a user to secure an article, such as the set of keys 286, within the clip 200 without having to apply an additional force, e.g., a force required to manipulate the tab 212 by a user's thumb. As illustrated in FIG. 28, the keys 286 may hang or dangle adjacent the first and second lowermost points 240, 242 of the first and second arms 214, 216, respectively.

Figure 29:
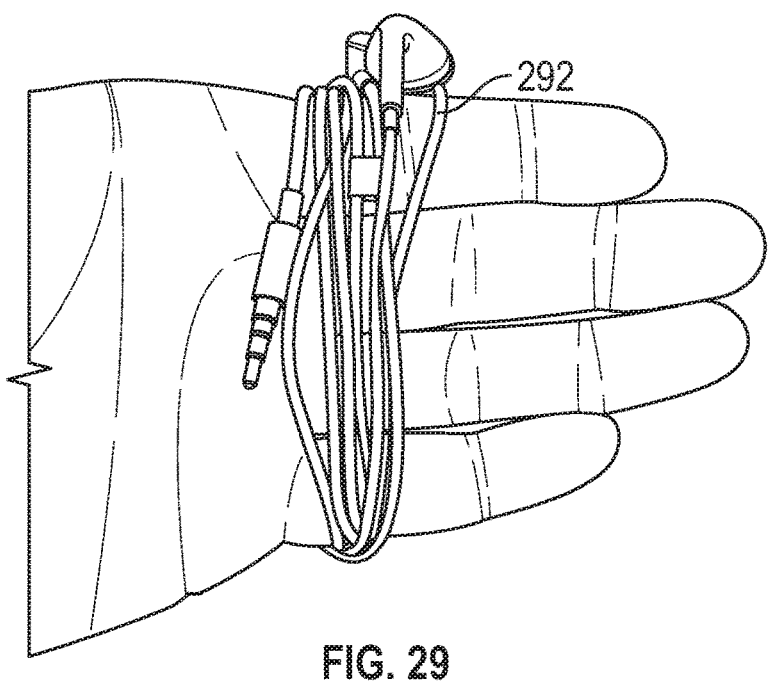
FIG. 29 is a front view of an example article, i.e., a cord, which is wrapped around a user's hand.
Figure 30:
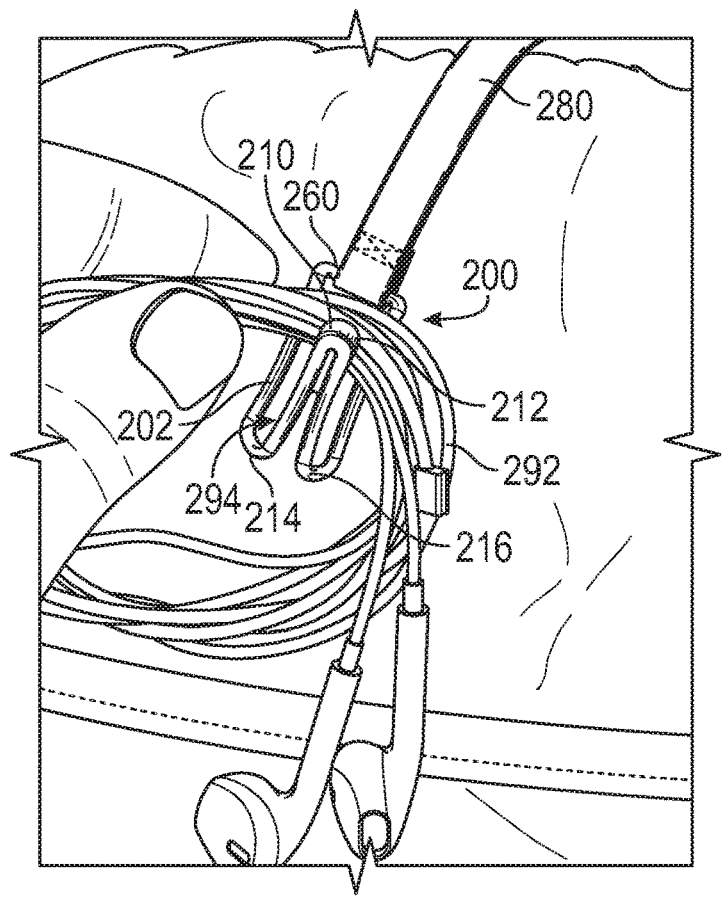
FIG. 30 is a front view of the article management clip of FIG. 25 shown in the open configuration with the cord of FIG. 29 being inserted into the article management clip.
Figure 31:
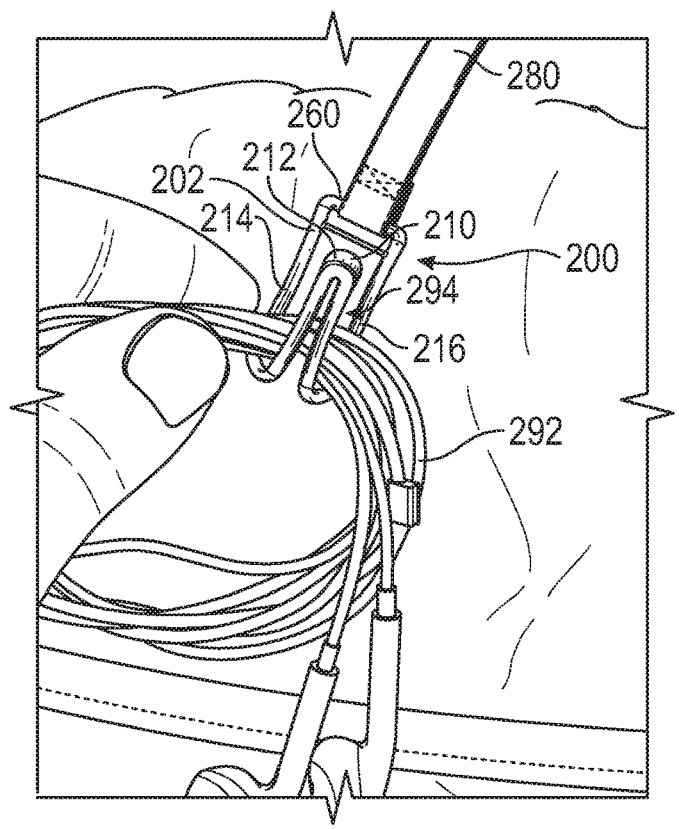
FIG. 31 is a front view of the article management clip of FIG. 25 in the article-receiving configuration, receiving the cord of FIG. 29.
Figure 32:
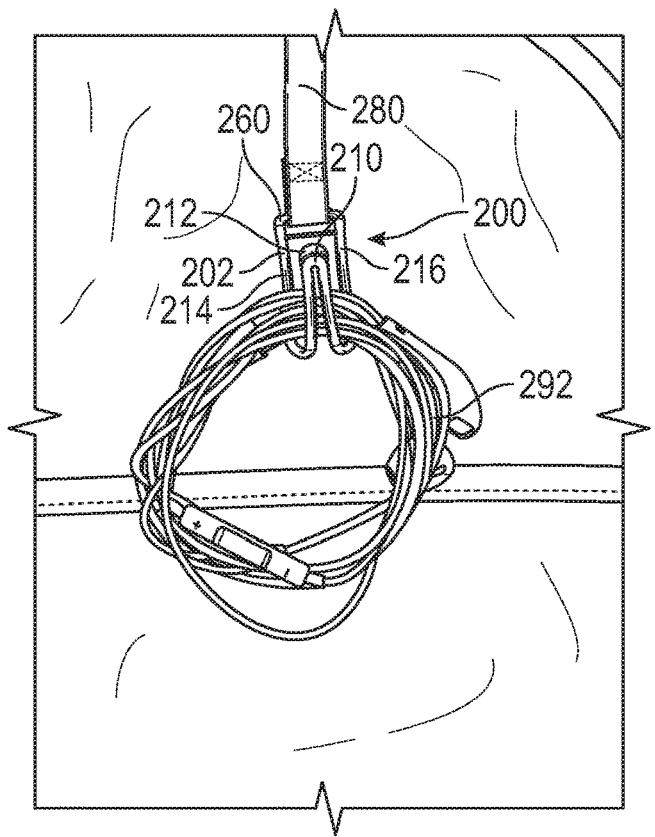
FIG. 32 is a front view of the article management clip of FIG. 25 in the closed configuration, securing the cord of FIG. 29.
Figure 33:
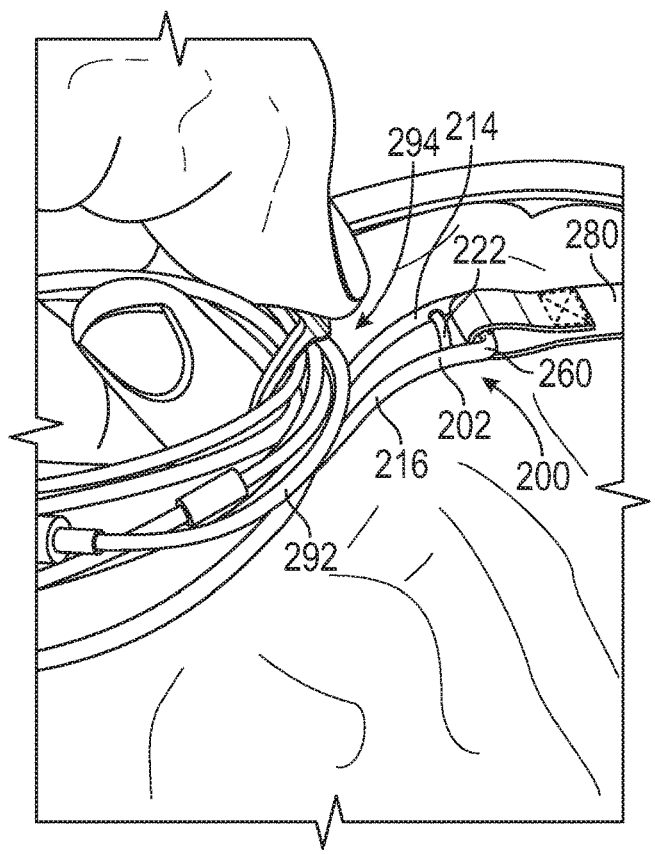
FIG. 33 is a front view of the article management clip of FIG. 25 in an article-removing configuration, with the cord of FIG. 29 being removed.
Figure 34:
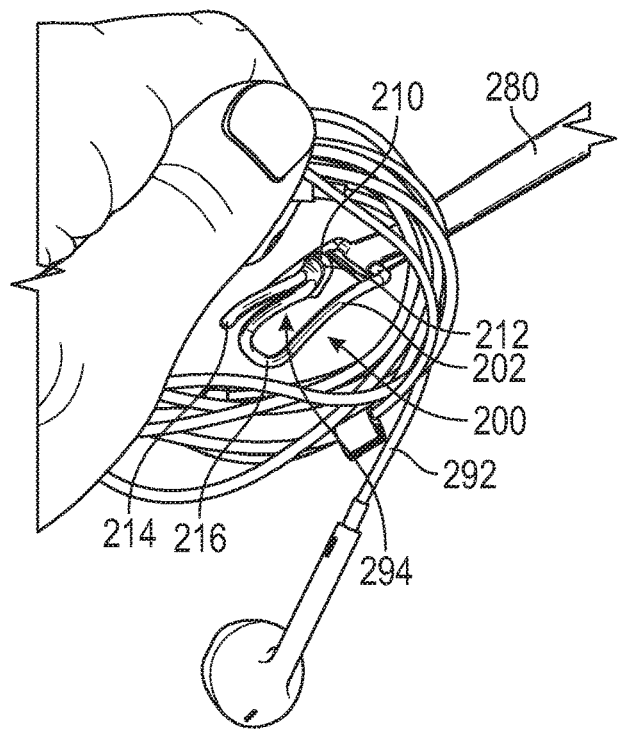
FIG. 34 is a front and right view of the article management clip of FIG. 25 in the closed configuration with the article of FIG. 29 having been removed therefrom.

Referring now to FIGS. 29-34, the functionality of the clip 200 will now be described with respect to the securement of a cord 292, which may be a cord for a set of headphones, or another type of elongate cord. The cord 292 is shown in FIG. 29, and the clip 200 is shown in an article-receiving configuration in FIG. 30. When a user desires to secure the cord 292 within the clip 200, the user manipulates the tab 212 of the clip 200 such that the tab 212 is pulled away from the first bar 260. After the tab 212 has been moved away from the first bar 260, the user may secure the cord 292 within a cavity 294 defined by the left arm 214, right arm 216, and nub 270 of the tab 212. Once a user ceases to apply a force to the tab 212, the clip 200 resiliently deforms back to its original state, i.e., a closed state, and the cord 292 is securely retained within the clip 200.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

We claim:

1. An article management clip, comprising:
   a body including:
      a tab;
      a first arm extending from the tab, the first arm having first, second, and third arm segments;
      a second arm extending from the tab, the second arm having first, second, and third arm segments; and
      a first member connecting the first arm with the second arm,
   wherein the first arm and the second arm are connected at a joint, and the first arm and the second arm define an angle of less than about 50 degrees,
   wherein the tab comprises a securement nub,
   wherein the body comprises a resilient material, and
   wherein the article management clip is configured to hold an article between the first, second, and third arm segments of the first arm and between the first, second, and third arm segments of the second arm.

2. The article management clip of claim 1, wherein the body is an integral component.

3. The article management clip of claim 1, wherein the body comprises a metal.

4. The article management clip of claim 1, wherein a second member extends between the first arm and the second arm, and is spaced apart from the first member.

5. The article management clip of claim 1, wherein the first arm includes a concave portion and the second arm includes a concave portion.

6. The article management clip of claim 1, wherein the body is configured to act as a spring by retracting into a first position after being manipulated into a second position by a user, and wherein the body is configured to apply pressure to an article that is retained by the clip when the clip is in the first position.

7. The article management clip of claim 1, wherein the body is symmetric about a plane that intersects the tab.

8. An article management clip, comprising:
a unitary body including:
a tab defining a first end;
a first arm extending from the tab;
a second arm extending from the tab;
an upper bar defining a second end, the upper bar being integrally connected with the first arm and the second arm, and
a cylindrical bar extending between the first arm and the second arm, and spaced apart from the upper bar,
wherein the tab comprises a planar surface and a securement nub, and
wherein the article management clip is further configured to couple with webbing that is threaded between the first arm and the second arm at the upper bar.

9. The article management clip of claim 8, wherein the body comprises a polymer.

10. The article management clip of claim 8, wherein the body comprises a metal.

11. The article management clip of claim 8, wherein the first arm includes a concave portion and the second arm includes a concave portion.

12. The article management clip of claim 8, wherein a first plane and a second plane that are orthogonal with respect to one another extend through the first arm, the second arm, and the securement nub.

13. The article management clip of claim 8, wherein the first arm and the second arm are connected at a joint, and
wherein the first arm and the second arm define an angle of less than about 30 degrees.

14. The article management clip of claim 8 further comprising an injection molding gate disposed along the upper bar.

15. An article management clip, comprising:
a unitary body including:
a tab defining a first end;
a first arm extending from the tab;
a second arm extending from the tab;
an upper bar defining a second end, the upper bar being integrally connected with the first arm and the second arm, and further comprising an injection molding gate, and
a cylindrical bar extending between the first arm and the second arm, and spaced apart from the upper bar, and
wherein the tab comprises a planar surface and a securement nub,
wherein a first plane and a second plane that are orthogonal with respect to one another extend through the first arm, the second arm, and the securement nub.

16. The article management clip of claim 15, wherein the body comprises a polymer or a metal.

17. The article management clip of claim 15, wherein the first arm includes a concave portion and the second arm includes a concave portion.

* * * * *